US00RE40344E

(19) United States
(12) Reissued Patent
Perevozchikov et al.

(10) Patent Number: US RE40,344 E
(45) Date of Reissued Patent: May 27, 2008

(54) SCROLL MACHINE WITH PORTED ORBITING SCROLL MEMBER

(75) Inventors: Michael M. Perevozchikov, Tipp City, OH (US); Roy J. Doepker, Lima, OH (US)

(73) Assignee: Emerson Climate Technologies, Inc., Sidney, OH (US)

(21) Appl. No.: 10/681,353

(22) Filed: Oct. 8, 2003

Related U.S. Patent Documents

Reissue of:
(64) Patent No.: 6,350,111
Issued: Feb. 26, 2002
Appl. No.: 09/639,004
Filed: Aug. 15, 2000

(51) Int. Cl.
*F04B 23/00* (2006.01)
*F04B 41/00* (2006.01)

(52) U.S. Cl. ..... 417/440; 418/55.6; 418/87; 418/99

(58) Field of Classification Search ..... 418/55.1–55.6, 418/84, 87, 99; 417/310, 440
See application file for complete search history.

(56) References Cited

U.S. PATENT DOCUMENTS

| | | | |
|---|---|---|---|
| 4,314,796 | A | 2/1982 | Terauchi |
| 4,475,360 | A | 10/1984 | Suefuji et al. |
| 4,502,852 | A | 3/1985 | Hazaki |
| 4,818,198 | A | 4/1989 | Tamura et al. |
| 4,898,521 | A | 2/1990 | Sakurai et al. |
| 5,059,098 | A | 10/1991 | Suzuki et al. |
| 5,178,527 | A | 1/1993 | Jung |
| 5,329,788 | A | 7/1994 | Caillat et al. |
| 5,370,513 | A | 12/1994 | Fain |
| 5,640,854 | A | 6/1997 | Fogt et al. |
| 5,645,408 | A | 7/1997 | Fujio et al. |
| 5,660,539 | A | 8/1997 | Matsunaga et al. |
| 5,722,257 | A | 3/1998 | Ishii et al. |
| 5,810,573 | A | 9/1998 | Mitsunaga et al. |
| 5,888,057 | A | 3/1999 | Kitano et al. |
| 5,931,650 | A | 8/1999 | Yasu et al. |
| 5,989,000 | A | 11/1999 | Tomayko et al. |
| 6,053,715 | A | 4/2000 | Hirano et al. |

FOREIGN PATENT DOCUMENTS

| | | | | |
|---|---|---|---|---|
| JP | 6-26472 | * | 2/1994 | ..... 417/440 |
| JP | 06026472 A | * | 2/1994 | ..... 417/440 |

OTHER PUBLICATIONS

European Search Report for Application No. EP 01 30 6855; Nov. 13, 2001; 1 Page.
English language Abstract for JP 6–26472, 01.02.94, 1 Page.
English language Abstract for JP 10037879, 13.02.98, 1 Page.

* cited by examiner

*Primary Examiner*—Theresa Trieu
(74) *Attorney, Agent, or Firm*—Harness, Dicckey & Pierce, P.L.C.

(57) ABSTRACT

A scroll compressor includes a fluid injection system. The fluid injection system includes a fluid passage which extends from a position outside of the shell of the compressor to the fluid pockets created by the wraps of the scroll members. The fluid passage extends through the orbiting scroll member. The fluid injection system can be used to inject gaseous or liquid refrigerant, lubricant or the fluid injection system can be used to vent the moving pocket to the suction area of the compressor for capacity modulation.

24 Claims, 4 Drawing Sheets

SCROLL MACHINE WITH PORTED ORBITING SCROLL MEMBER

Matter enclosed in heavy brackets [ ] appears in the original patent but forms no part of this reissue specification; matter printed in italics indicates the additions made by reissue.

FIELD OF THE INVENTION

The present invention relates generally to scroll-type machines. More particularly, the present invention relates to hermetic scroll compressors incorporating a fluid injection system where the fluid injection system utilizes a fluid passage extending through the end plate of the orbiting scroll member.

BACKGROUND AND SUMMARY OF THE INVENTION

Refrigeration and air conditioning systems generally include a compressor, a condenser, an expansion valve or an equivalent, and an evaporator. These components are coupled in sequence in a continuous flow path. A working fluid flows through the system and alternates between a liquid phase and a vapor or gaseous phase.

A variety of compressor types have been used in refrigeration systems, including but not limited to reciprocating compressors, screw compressors and rotary compressors. Rotary type compressors can include the various vane type compressors as scroll machines. Scroll compressors are constructed using two scroll members with each scroll member having an end plate and a spiral wrap. The scroll members are mounted so that they may engage in relative orbiting motion with respect to each other. During this orbiting movement, the spiral wraps define a successive series of enclosed spaces or pockets, each of which progressively decrease in size as it moves inwardly from a radial outer position at a relatively low suction pressure to a central position at a relatively high pressure. The compressed gas exists from the enclosed space at the central position through a discharge passage formed through the end plate of one or the scroll members.

The designers for these scroll-type machines need to have access to these enclosed spaces or pockets as they move between suction and discharge for various reasons. One reason for accessing these moving pockets is to inject oil into the pockets in order to lubricate and cool the scroll members as they compress the fluid. Another reason for accessing these moving pockets, for a refrigerant compressor, is to inject liquid refrigerant to provide cooling for the scroll members. Anther reason for accessing these moving pockets is to connect these intermediate pockets to the suction zone of the compressor in order to reduce the capacity of the compressor in a capacity modulation system. Still another reason for accessing these moving pockets is to inject an additional quantity of the fluid being compressed in vapor form in order to increase the compression ratio or capacity of the scroll machine.

Various prior art methods have been utilized to gain access to these moving pockets. When the access to these moving pockets does not require access from outside the hermetic shell of the compressor, such as oil injection and/or capacity modulation, the access can be achieved through either the orbiting scroll or the non-orbiting scroll, depending on the design intent for the injection system. When the access to these moving pockets does require access from outside the hermetic shell, such as liquid injection and vapor injection systems, the access is provided through the stationary or non-orbiting scroll due to the ease of communicating with a stationary scroll member rather than the moving orbiting scroll member.

The continued development for fluid injection systems include the optimizing of the designs for gaining access to the moving pockets of compressed fluid. The present invention provides the art with a method of accessing the moving fluid pockets from outside the hermetic shell of the compressor through a passage extending through the end plate of the orbiting scroll member. Accessing the moving pockets from outside the hermetic shell through the orbiting scroll provides for less expensive and simpler assembly of the scroll machine as well as less expensive machining requirements for the scroll members.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
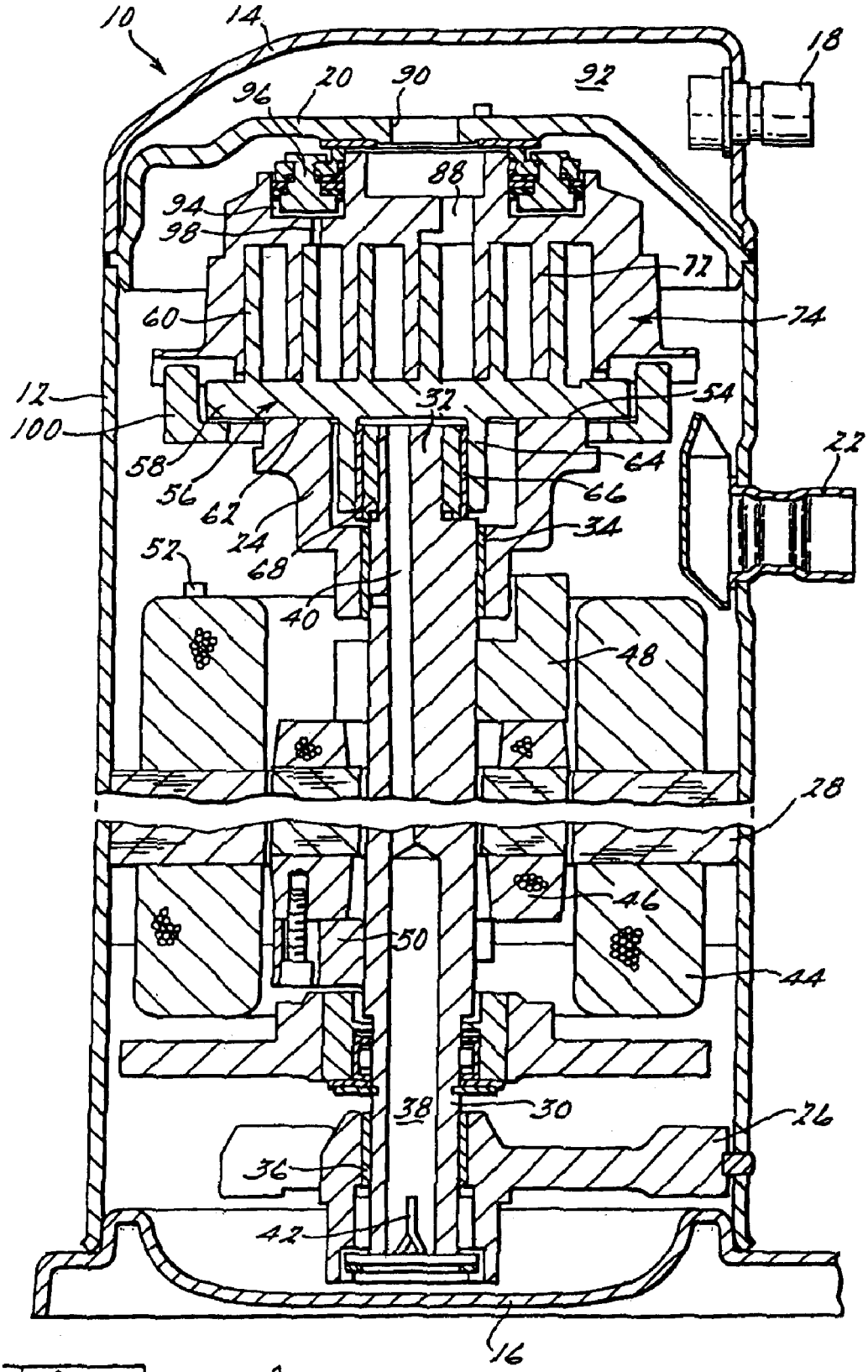
FIG. 1 is a vertical cross sectional view of a scroll compressor incorporating a unique fluid injection system in accordance with the present invention.

Referring now to the drawings in which like reference numerals designate like or corresponding parts throughout the several views, there is shown in FIG. 1 a hermetic shell compressor incorporating the unique fluid injection system in accordance with the present invention which is identified generally by the reference numeral 10. Scroll compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to shell 12 includes a transversely extending partition 20 which is welded about its periphery at the same point cap 14 is welded to shell 12, an inlet fitting 22, a main bearing housing 24 which is suitably secured to shell 12 and a lower bearing housing 26 having a plurality of radially outwardly extending legs each of which is suitably secured to shell 12. A motor stator 28 which is generally square in cross-section but with the corners rounded off is press fit into shell 12. The flats between the rounded corners on stator 28 provide passageways between stator 28 and shell 12 which facilitate the return flow of the lubricant from the top of shell 12 to its bottom.

A drive shaft or crankshaft 30 having an eccentric pin 32 at the upper end thereof is rotatably journaled in a bearing 34 in main bearing housing 24 and in a bearing 36 in lower bearing housing 26. Crankshaft 30 has at the lower end thereof a relatively large diameter concentric bore 38 which communicates with a radially outwardly located smaller diameter bore 40 extending upwardly therefrom to the top of crankshaft 30. Disposed within bore 38 is a stirrer 42. The lower portion of the interior shell 12 is filled with lubricating oil and bores 38 and 40 act as a pump to pump the lubricating oil up crankshaft 30 and ultimately to all of the various portions of compressor 10 which require lubrication.

Crankshaft 30 is relatively driven by an electric motor which includes motor stator 28 having windings 44 passing therethrough and a motor rotor 46 press fitted onto crankshaft 30 and having upper and lower counterweights 48 and 50, respectively. A motor protector 52, of the usual type, is provided in close proximity to motor windings 44 so that if the motor exceeds its normal temperature range, motor protector 52 will de-energize the motor.

The upper surface of main bearing housing 24 is provided with an annular flat thrust bearing surface 54 on which is disposed an orbiting scroll member 56. Scroll member 56 comprises an end plate 58 having the usual spiral vane or wrap 60 on the upper surface thereof and an annular flat thrust surface 62 on the lower surface thereof. Projecting downwardly from the lower surface is a cylindrical hub 64 having a journal bearing 66 therein and in which is rotatively disposed a drive bushing 68 having an inner bore within which crank pin 32 is drivingly disposed. Crank pin 32 has a flat on one surface (not shown) which drivingly engages a flat surface in a portion of the inner bore of drive bushing 68 to provide a radially complaint drive arrangement such s shown in assignee's U.S. Pat. No. 4,877,382, the disclosure of which is incorporated herein by reference.

Wrap 60 meshes with a non-orbiting scroll wrap 72 forming part of a non-orbiting scroll member 74. During orbital movement of orbiting scroll member 56 with respect to non-orbiting scroll member 74 creates moving pockets of fluid which are compressed as the pocket moves from a radially outer position to a central position of scroll members 56 and 74. Non-orbiting scroll member 74 is mounted to main bearing housing 24 in any desired manner which will provide limited axial movement of non-orbiting scroll member 74. The specific manner of such mounting is not critical to the present invention. However, in the preferred embodiment, non-orbiting scroll member 74 has a plurality of circumferentially spaced mounting bosses 76 (see FIGS. 2 and 3), each having a flat upper surface 78 and an axial bore 80. A sleeve 82 is slidably disposed within bore 80 and sleeve 82 is bolted to main bearing housing 24 by a bolt 84. Bolt 84 has an enlarged head which engages upper surface 78 to limit the axial upper or separating movement of non-orbiting scroll member 74. Movement of non-orbiting scroll member 74 is the opposite direction is limited by axial enlargement of the lower tip surface of wrap 72 and the flat upper surface of orbiting scroll member 56.

Non-orbiting scroll member 74 has a centrally disposed discharge port 88 which is in fluid communication via an opening 90 in partition 20 with a discharge muffler 92 defined by cap 14 and partition 20. Fluid compressed by the moving pockets between scroll wraps 60 and 72 discharges into discharge muffler 92 through port 88 and opening 90. Non-orbiting scroll member 74 has in the upper surface thereof an annular recess 94 having parallel coaxial sidewalls within which is sealingly disposed for relative axial movement an annular seal assembly 96 which serves to isolate the bottom of recess 94 so that it can be placed in fluid communication with a source of intermediate fluid pressure by means of a passageway 98. Non-orbiting scroll member 74 is thus axially biased against orbiting scroll member 56 by the forces created by discharge pressure acting on the central portion of non-orbiting scroll member 74 and the forces created by intermediate fluid pressure acting on the bottom of recess 94. This axial pressure biasing, as well as the various techniques for supporting non-orbiting scroll member 74 for limited axial movement, are disclosed in much greater detail in assignee's aforementioned U.S. Pat. No. 4,877,382.

Relative rotation of scroll members 56 and 74 is prevented by the usual Oldham Coupling 100 having a pair of keys slidably disposed in diametrically opposing slots in non-orbiting scroll member 74 and a second pair of keys slidably disposed in diametrically opposed slots in orbiting scroll member 56.

Compressor 10 is preferably of the "low side" type in which suction gas entering shell 12 is allowed, in part, to assist in cooling the motor. So long as there is an adequate flow of returning suction gas, the motor will remain within the desired temperature limits. When this flow ceases, however, the loss of cooling will cause motor protector 52 to trip and shut compressor 10 down.

The scroll compressor, as thus broadly described, is either known in the art or it is the subject matter of other pending applications for patent by Applicant's assignee. The details of construction which incorporate the principles of the present invention are those which deal with a unique fluid injection system identified generally by reference numeral 110. Fluid injection system 110 can be used to inject liquid refrigerant for cooling purposes, vapor or gaseous refrigerant for capacity increase, oil for lubrication and cooling or fluid injection system 110 can be used for capacity modulation. The present invention, for exemplary purposes, will be described using a vapor injection system as fluid injection system 110 but it is to be understood that other fluids could be injected or fluids can be vented using fluid injection system 110.

Figure 2:
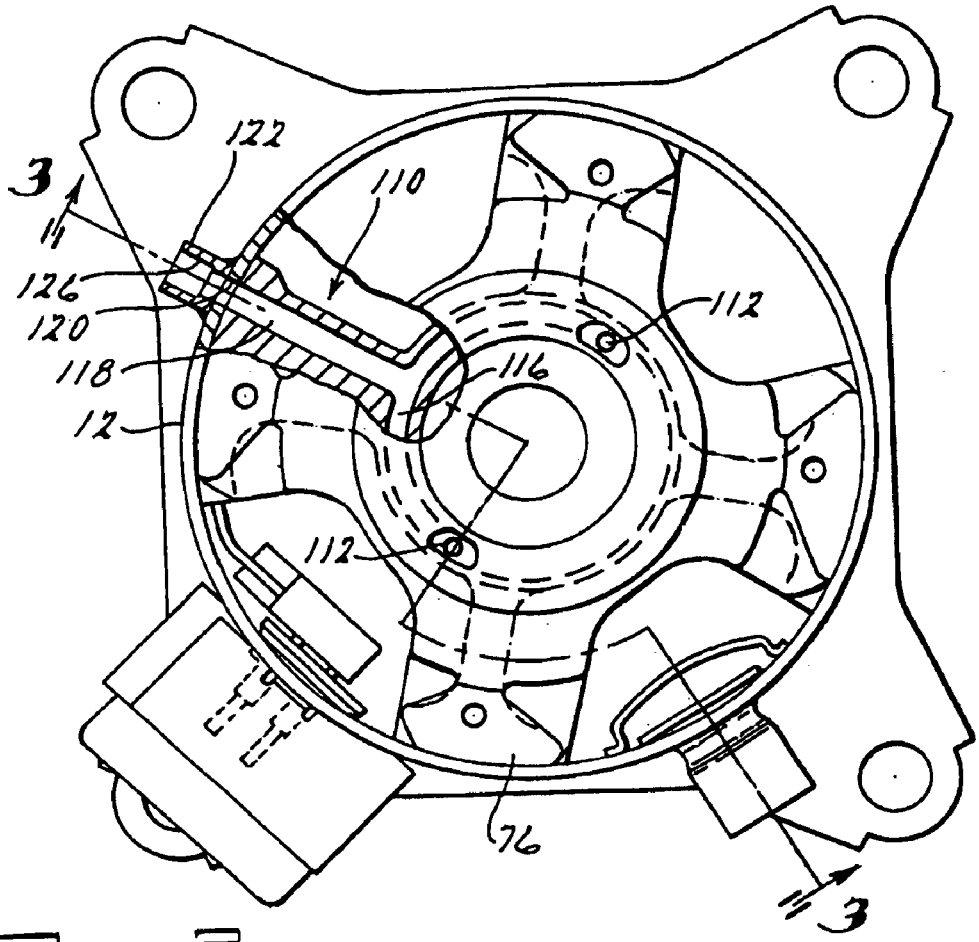
FIG. 2 is a plan view, partially in cross-section of the scroll compressor shown in FIG. 1.
Figure 3:
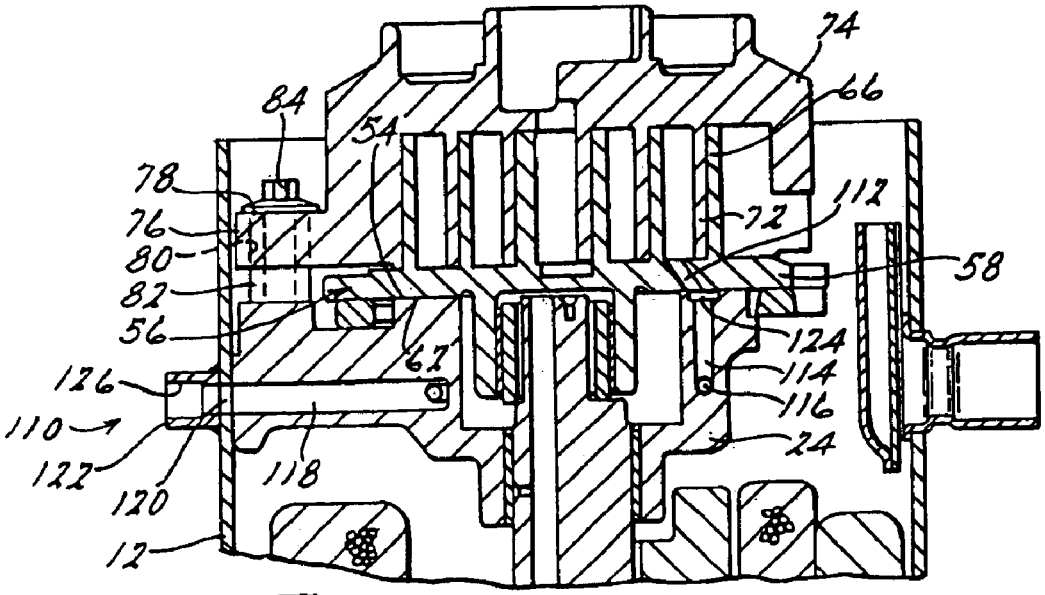
FIG. 3 is an enlarged cross-sectional view taken generally along line 3-3 in FIG. 2 showing the injection system for the compressor shown in FIG. 1.

Referring now to FIGS. 1-3, fluid injection system 110 comprises a pair of fluid injection passages 112 extending through end plate 58 of orbiting scroll member 56, a pair of generally vertical fluid passages 114 in main bearing housing 24, a generally circular horizontal fluid passage 116 in main bearing housing 24, a generally horizontal fluid passage 118 extending through one of the legs of main bearing housing 24, a fluid injection port 120 extending through shell 12, and a fluid injection fitting 122 secured to the outside of shell 12.

Fluid injection passages 112 extend through end plate 58 of orbiting scroll member 56. The positioning of the opening for passages 112 on the wrap side of the end plate will be determined by the positioning during the compression cycle that fluid is going to be injected or released from a pair of the moving pockets between wraps 60 and 72. The positioning of the opening for passages 112 on thrust surface 62 of scroll member 56 will be such that the opening of passages 112 will always be adjacent thrust bearing surface 54 of main bearing housing 24 throughout the entire orbital movement of orbiting scroll member 56. This feature is described below as it relates to fluid passage 114.

Fluid passages 114 each extend vertically from thrust bearing surface 54 to fluid passage 116. Each fluid passage 114 comprises a counter bored portion 124 which opens up on thrust bearing surface 54. Counter bored portions 124 are sized such that fluid communication is always maintaining with its respective fluid injection hole 112 during all orbiting movement of orbiting scroll member 56.

Generally circular horizontal passage 116 extends between the pair of fluid passages 114 and horizontal fluid passage 118. Fluid passage 118 extends generally horizontally through one of the legs of main bearing housing 24. Fluid passage 118 opens to injection port 120 which extends through shell 12. Fluid injection fitting 122 is secured to shell 12 by welding and it includes a central bore 126 in fluid communication with port 120.

Thus, access from injection fitting 122 to the moving compression pockets between scroll wraps 60 and 72 is provided through bore 126, through port 120, through passage 118, through passage 116, through passage 114 and counter bore 124, and through passages 112. Fluid can be injected into the moving pockets between scroll wraps 60 and 72 or fluid can be removed from the moving pockets between scroll wraps 72 and 66 through fitting 122.

Figure 4:
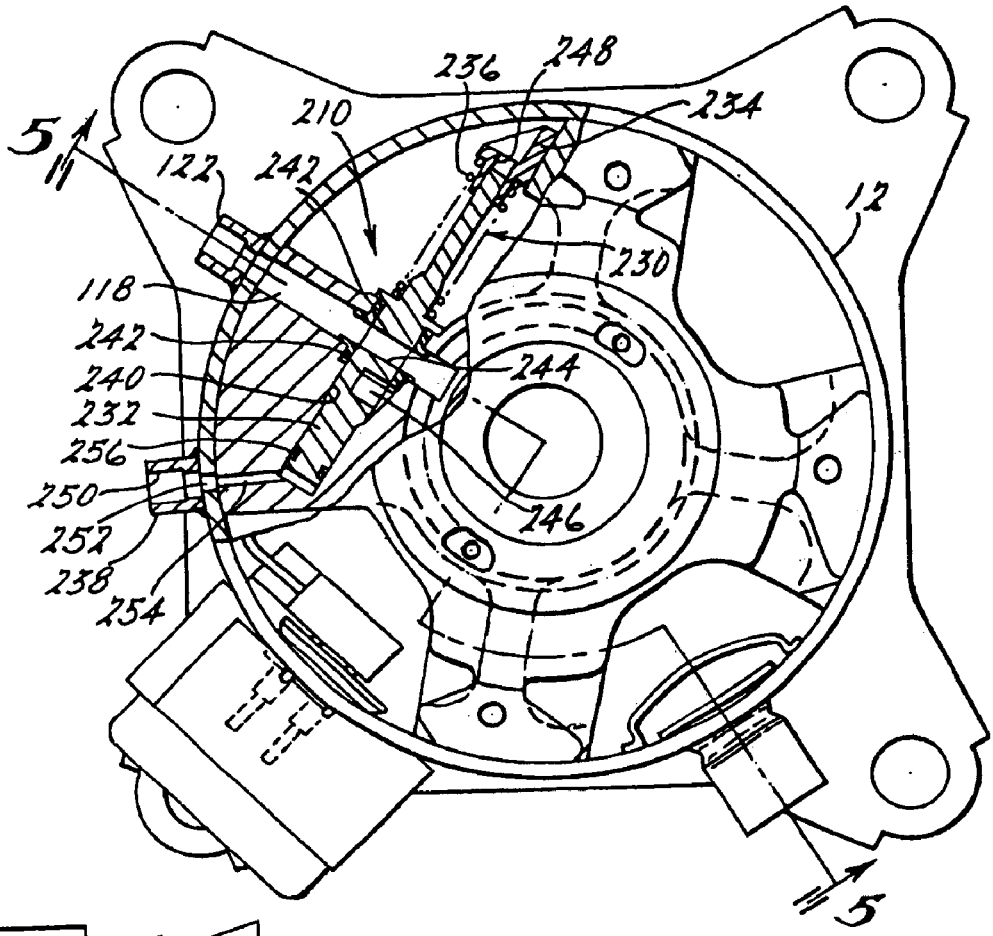
FIG. 4 is a plan view, partially in cross-section, of a unique fluid injection system in accordance with another embodiment of the present invention.
Figure 5:
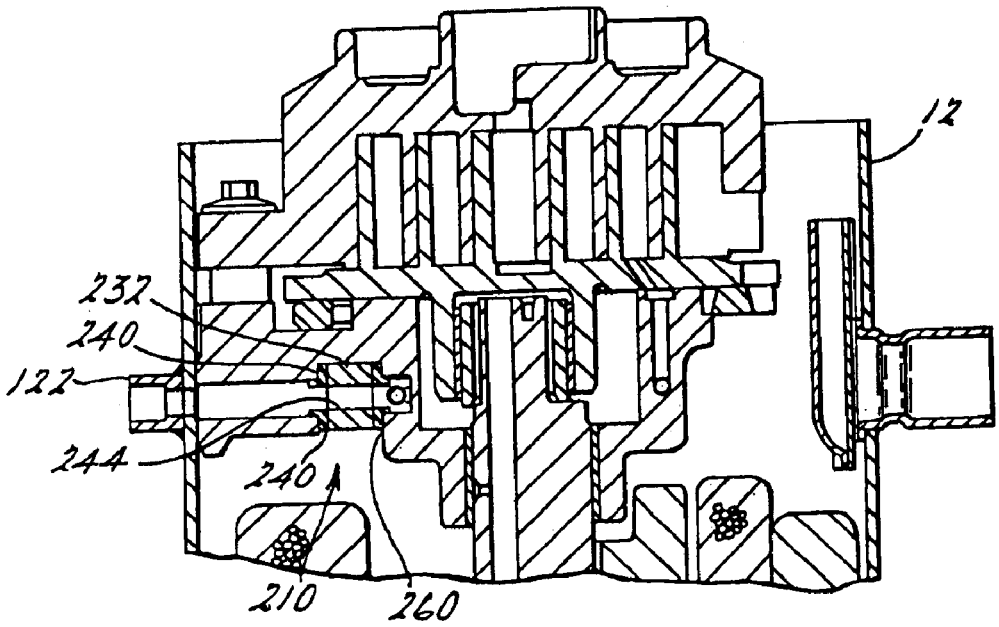
FIG. 5 is an enlarged cross-sectional view taken generally alone line 5-5 in FIG. 4 showing the injection system shown in FIG. 4.

Referring now to FIGS. 4 and 5, a fluid injection system 210 according to another embodiment of the present invention is illustrated. Fluid injection system 210 is similar to fluid injection system 110 except that fluid injection system 210 incorporates an internal valve system 230 which can replace any type of external valve system incorporated with fluid injection system 110. Internal value system 230 is disposed inside shell 12 as opposed to an external system. Internal valve system 230 comprises a slider valve 232, a valve guide support 234, a valve return spring 236 and an activating fitting 238.

Slider valve 232 is slidingly disposed within a bore 240 which intersects with generally horizontal fluid passage 118. A pair of seals 242 seal the fluid within fluid passage 118 from bore 240. Slider valve 232 defines a vapor injection through hole 244 and a modulation slot 246. Vapor injection through hole 244 is utilized for providing vapor injection into the fluid pockets between scroll wraps 60 and 72 to increase the capacity of the compressor. Modulation slot 246 is utilized for providing delayed compression by releasing the compressed fluid in the fluid pockets between scroll wraps 60 and 72 to modulate or reduce the capacity of the compressor. The combination of the vapor injection and the delayed compression allows for an increase in the modulation of the compressor when the full capacity of the compressor is with vapor injection. Assuming a compressor without vapor injection operates at 100% capacity and, with capacity modulation due to delayed compression, the capacity is reduced to approximately 60%, the incorporation of vapor injection will increase its capacity to approximately 120%. When valve system 230 switches from vapor injection to modulation, the capacity will reduce to the original 60%. Thus, a 60% capacity modulation (100% to 60%) becomes a 50% capacity modulation (120% to 60%).

Valve guide support 234 is attached to an adjacent leg of main bearing housing 24 and it defines bore 248 which slidingly receives slider valve 232 and guides its movement. Valve return spring 236 is located between valve guide support 234 and slider valve 232 to bias slider valve 232 into its vapor injection position as shown in FIG. 4. Activating fitting 238 is in communication with one end of bore 240 through a bore 250 in fitting 238, a port 252 in shell 12 and a passage 254 in the leg of main bearing housing 24. Bore 250 is connected to a source of pressurized fluid, such as the discharge pressure of the compressor, through a valve such as a solenoid valve. When this pressurized fluid is provided to the end of bore 240, slider valve 232 moves from its position shown in FIG. 4 to a position where modulation slot 246 aligns with fluid passage 118 to permit modulation of the capacity of the compressor through a port 260 extending through main bearing housing 24. A seal 256 isolates the pressurized fluid provided through activating fitting 238. When the vapor injection feature is again desired, the pressurized fluid can be released from fitting 238 allowing valve return spring 236 to again align vapor injection through hole with passage 118 as shown in FIG. 4.

Figure 6:
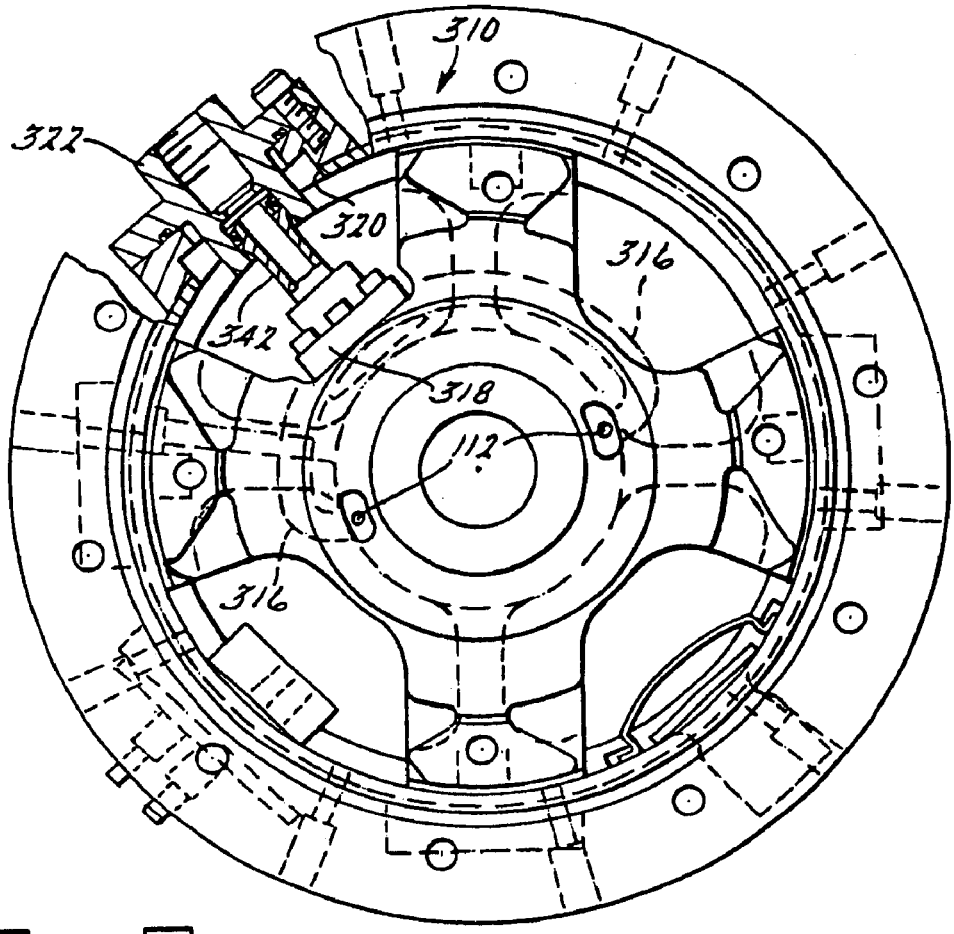
FIG. 6 is a plan view, partially in cross-section, of a unique fluid injection system in accordance with another embodiment of the present invention.
Figure 7:
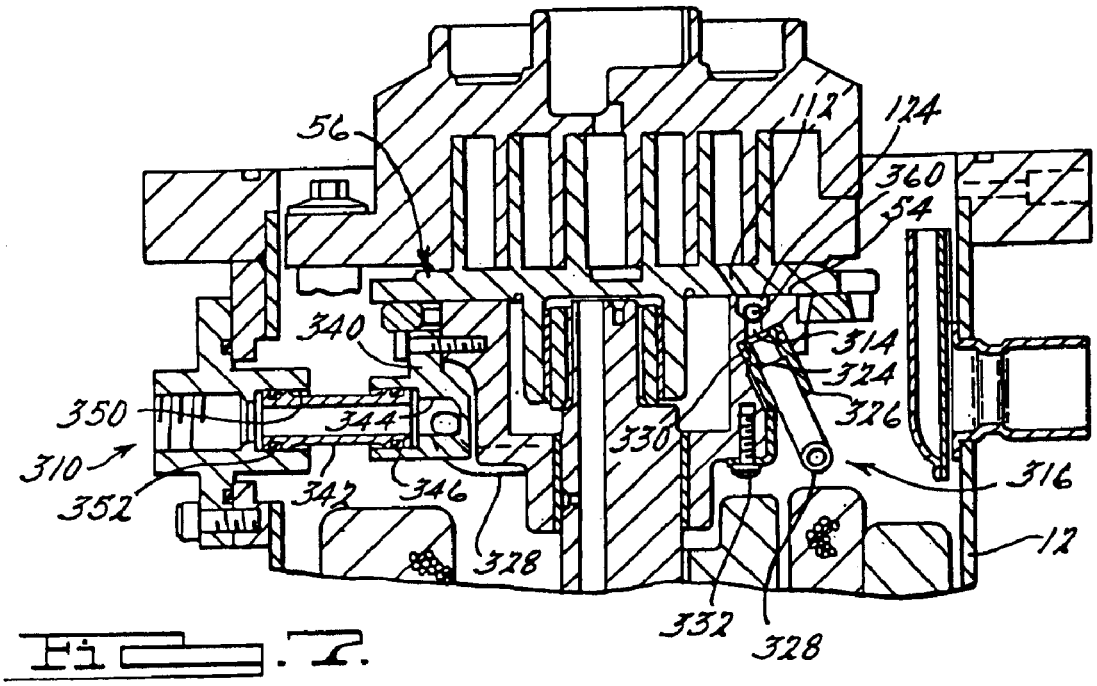
FIG. 7 is an enlarged cross-sectional view showing the injection system shown in FIG. 6.

Referring now to FIGS. 6 and 7, a fluid injection system 310 according to another recombinant of the present invention is illustrated. Fluid injection system 310 provides an alternative method for accessing the moving pockets defined by wraps 60 and 72. Fluid injection system 310 comprises the pair of fluid injection passages 112, a pair of generally vertical fluid passages 314, a pair of tubing assemblies 316, a tubing connector assembly 318, a fluid injection port 320 and a fluid injection fitting 322.

Fluid passages 314 each extend generally vertical from thrust bearing surface 54 to the internal suction area of shell 12. Each fluid passage 314 comprises counter bored portion 124 which opens upon on thrust bearing surface 54. Counter bore portions 124 maintain communication with their respective injection hole 112 during all movement of orbiting scroll member 56. The lower ends of fluid passages 314 each define an enlarged bore 324 which mates with a respective tubing assembly 316.

Each tubing assembly 316 extends between tubing connector assembly 318 and a respective enlarged bore 324. Each tubing assembly 316 includes a fitting 326 which engages a respective bore 324 and a tube 328 which extends between fitting 326 and tubing connector assembly 318. A seal 330 seals the interface between bore 324 and fitting 326, and a retainer 332 keeps fitting 326 disposed within bore 324.

Tubing connector assembly 318 comprises a main bearing housing fitting 340 and a connecting tube 342. Fitting 340 is secured to main bearing housing 24 by a plurality of bolts. Fitting 340 defines an internal bore 344 which is in communication with the pair of tubes 328. Connecting tube 342 is disposed within bore 344 of fitting and extends to fluid injection fitting 322. A seal 346 seals the interface between tube 342 and bore 344.

Fluid injection fitting 322 extends through port 320 and is secured to shell 12 and it defines an internal bore 350 which receives the opposite end of connecting tube 342. A seal 352 seals the interface between tube 342 and bore 350. Thus, fitting 322 is in communication with pockets of compressed moving fluid defined by wraps 60 and 72 through bore 350, tube 342, bore 344, tubes 328, fitting 326, fluid passages 314 and injection passages 112.

Fluid injection system 310 also includes a check valve 360 which allows fluid flow from fitting 322 to injection passages 112 but prohibits fluid flow from injection passages 112 to fitting 322.

While the above detailed description describes the preferred embodiment of the present invention, it should be understood that the present invention is susceptible to modification, variation and alteration without deviating from the scope and fair meaning of the subjoined claims.

What is claimed is:

1. A scroll-type compressor for handling a working fluid, said compressor comprising:

a shell having a suction zone and a discharge zone;

a first scroll member disposed in said shell and having a first scroll wrap extending from a first end plate;

a second scroll member disposed in said shell and having a second scroll wrap extending from a second end plate, said second scroll wrap being intermeshed with said first scroll wrap to define a plurality of closed pockets;

a drive mechanism for causing said second scroll member to orbit with respect to said first scroll member, said plurality of pockets moving from a radial outer position in said suction zone to a central position in said discharge zone;

*a vapor injection system including* a fluid circuit in communication with at least one of said plurality of pockets, said fluid circuit including a fluid passage extending from said one pocket to a position outside said shell *for injecting vapor into said one pocket and increasing a capacity of the compressor*, said fluid passage extending through said second scroll member; and a valve for controlling fluid flow through said fluid passage.

2. The scroll-type compressor according to claim 1, wherein said valve is disposed within said shell.

3. The scroll-type compressor according to claim 2, wherein said valve is controlled by a pressurized fluid from outside said shell.

4. A scroll-type compressor for handling a working fluid[:], said compressor comprising:

a shell;

a non-orbiting scroll member disposed within said shell and having a nonorbiting scroll wrap extending from a non-orbiting end plate;

an orbiting scroll member disposed within said shell and having an orbiting scroll wrap extending from an orbiting end plate, said orbiting scroll wrap being intermeshed with said non-orbiting scroll member to define a plurality of closed pockets;

a drive mechanism for causing said orbiting scroll member to orbit with respect to said non-orbiting scroll member, said plurality of closed pockets moving from a radial outer position where said working fluid is at a suction pressure to a radially inner central position where said working fluid is at a higher discharge pressure during said orbital movement;

*a vapor injection system including* a fluid circuit in communication with at least one of said plurality of moving pockets, said fluid circuit including a fluid passage extending from said one pocket to a position outside of said shell *for injecting vapor into said one pocket and increasing a capacity of the compressor*, said fluid pocket extending through said orbiting scroll member; and a valve for controlling fluid flow through said fluid passage.

5. The scroll-type compressor according to claim 4, wherein said valve is disposed within said shell.

6. The scroll-type compressor according to claim 5, wherein said valve is controlled by a pressurized fluid from outside said shell.

7. A scroll-type compressor for handling a working fluid, said compressor comprising:

a shell having a suction zone and a discharge zone;

a first scroll member disposed in said shell and having a first scroll wrap extending from a first end plate;

a second scroll member disposed in said shell and having a second scroll wrap extending from a second end plate, said second scroll wrap being intermeshed with said first scroll wrap to define a plurality of closed pockets;

a drive mechanism for causing said second scroll member to orbit with respect to said first scroll member, said plurality of pockets moving from a radial outer position in said suction zone to a central position in said discharge zone;

a fluid circuit in communication with at least one of said plurality of pockets, said fluid circuit including a fluid passage extending from said one pocket to a position outside said shell, said fluid passage extending through said second scroll member;

a housing disposed within said shell, said housing supporting said second scroll member, said fluid passage extending through said housing; and a valve disposed within said housing, said valve controlling fluid flow through said fluid passage.

8. The scroll-type compressor according to claim 1, wherein said valve is controlled by a pressurized fluid from outside said shell.

9. A scroll-type compressor for handling a working fluid; said compressor comprising:

a shell;

a non-orbiting scroll member disposed within said shell and having a nonorbiting scroll wrap extending from a non-orbiting end plate;

an orbiting scroll member disposed within said shell and having an orbiting scroll wrap extending from an orbiting end plate, said orbiting scroll wrap being intermeshed with said non-orbiting scroll member to define a plurality of closed pockets;

a drive mechanism for causing said orbiting scroll member to orbit with respect to said non-orbiting scroll member, said plurality of closed pockets moving from a radial outer position where said working fluid is at a suction pressure to a radially inner central position where said working fluid is at a higher discharge pressure during said orbital movement;

a fluid circuit in communication with at least one of said plurality of moving pockets, said fluid circuit including a fluid passage extending from said one pocket to a position outside of said shell, said fluid pocket extending through said orbiting scroll member;

a housing disposed within said shell, said housing supporting said orbiting scroll member, said fluid passage extending through said housing; and a valve disposed within said housing, said valve controlling fluid flow through said fluid passage.

10. The scroll-type compressor according to claim 9, wherein said valve is controlled by a pressurized fluid from outside said shell.

11. A scroll-type compressor for handling a working fluid, said compressor comprising:

a shell having a suction zone and a discharge zone;

a first scroll member disposed in said shell and having a first scroll wrap extending from a first end plate;

a second scroll member disposed in said shell and having a second scroll wrap extending from a second end plate, said second scroll wrap being intermeshed with said first scroll wrap to define a plurality of closed pockets;

a drive mechanism for causing said second scroll member to orbit with respect to said first scroll member, said plurality of pockets moving from a radial outer position in said suction zone to a central position in said discharge zone;

a fluid circuit in communication with at least one of said plurality of pockets, said fluid circuit including a fluid passage extending from said one pocket to a position outside said shell, said fluid passage extending through said second scroll member; and a housing having a plurality of legs disposed within said shell, said housing supporting said second scroll member, said fluid passage extending through one of said legs of said housing.

12. The scroll-type compressor according to claim 11, further comprising a valve disposed within said housing, said valve controlling fluid flow through said fluid passage.

13. The scroll-type compressor according to claim 12, wherein said valve is controlled by a pressurized fluid from outside said shell.

14. A scroll-type compressor for handling a working fluid; said compressor comprising:

a shell;

a non-orbiting scroll member disposed within said shell and having a nonorbiting scroll wrap extending from a non-orbiting end plate;

an orbiting scroll member disposed within said shell and having an orbiting scroll wrap extending from an orbiting end plate, said orbiting scroll wrap being intermeshed with said non-orbiting scroll member to define a plurality of closed pockets;

a drive mechanism for causing said orbiting scroll member to orbit with respect to said non-orbiting scroll member, said plurality of closed pockets moving from a radial outer position where said working fluid is at a suction pressure to a radially inner central position where said working fluid is at a higher discharge pressure during said orbital movement;

a fluid circuit in communication with at least one of said plurality of moving pockets, said fluid circuit including a fluid passage extending from said one pocket to a position outside of said shell, said fluid pocket extending through said orbiting scroll member; and a housing having a plurality of legs disposed within said shell, said housing supporting said orbiting scroll member, said fluid passage extending through one of said legs of said housing.

15. The scroll-type compressor according to claim 14, further comprising a valve disposed within said one leg of said housing, said valve controlling fluid flow through said fluid passage.

16. The scroll-type compressor according to claim 15, wherein said valve is controlled by a pressurized fluid from outside said shell.

17. A scroll-type compressor for handling a working fluid, said compressor comprising:

a shell having a suction zone and a discharge zone;

a first scroll member disposed in said shell and having a first scroll wrap extending from a first end plate;

a second scroll member disposed in said shell and having a second scroll wrap extending from a second end plate, said second scroll wrap being intermeshed with said first scroll wrap to defined a plurality of closed pockets;

a drive mechanism for causing said second scroll member to orbit with respect to said first scroll member, said plurality of pockets moving from a radial outer position in said suction zone to a central position in said discharge zone;

a first circuit in communication with at least one of said plurality of pockets, said fluid circuit including a fluid passage extending from said one pocket to said suction zone of said compressor, said fluid passage extending through said second scroll member; [and]

a housing disposed within said shell, said housing supporting said second scroll member, said fluid passage extending through said housing*; and*

*a valve disposed within said housing, said valve controlling fluid flow through said fluid passage.*

[18. The scroll-type compressor according to claim 17, further comprising a valve disposed within said housing, said valve controlling fluid flow through said fluid passage.]

19. The scroll-type compressor according to claim [18]*17*, wherein said valve is controlled by a pressurized fluid from outside said shell.

20. The scroll-type compressor according to claim [18]*17*, wherein said fluid passage is in communication with an injection port extending through said shell and said valve is movable between a first position where said one pocket communicates with said suction zone of said compressor and a second position where said one pocket communicates with said injection port extending through said shell.

21. A scroll-type compressor for handling a working fluid, said compressor comprising:

a shell having a suction zone and a discharge zone;

a first scroll member disposed in said shell and having a first scroll wrap extending from a first end plate;

a second scroll member disposed in said shell and having a second scroll wrap extending from a second end plate, said second scroll wrap being intermeshed with said first scroll wrap to define a plurality of closed pockets;

a drive mechanism for causing said second scroll member to orbit with respect to said first scroll member, said plurality of pockets moving from a radial outer position in said suction zone to a central position in said discharge zone;

a fluid circuit in communication with at least one of said plurality of pockets, said fluid circuit including a fluid passage extending from said one pocket to said suction zone of said compressor, said fluid passage extending through said second scroll member; and a valve for controlling fluid flow through said fluid passage; wherein;

said valve is disposed within said shell; and said valve is controlled by a pressurized fluid from outside said shell.

22. The scroll-type compressor according to claim 21, wherein said fluid passage is in communication with an injection port extending through said shell and said valve is movable between a first position where said one pocket communicates with said suction zone of said compressor and a second position where said one pocket communicates with said injection port extending through said shell.

23. A scroll-type compressor for handling a working fluid, said compressor comprising:

a shell having a suction zone and a discharge zone;

a first scroll member disposed in said shell and having a first scroll wrap extending from a first end plate;

a second scroll member disposed in said shell and having a second scroll wrap extending from a second end plate, said second scroll wrap being intermeshed with said first scroll wrap to define a plurality of closed pockets;

a drive mechanism for causing said second scroll member to orbit with respect to said first scroll member, said plurality of pockets moving from a radial outer position in said suction zone to a central position in said discharge zone;

a fluid circuit in communication with at least one of said plurality of pockets, said fluid circuit including a fluid passage extending from said one pocket to said suction zone of said compressor, said fluid passage extending through said second scroll member; and a housing having a plurality of legs disposed within said shell, said housing supporting said first scroll member, said fluid passage extending through one of said legs of said housing.

24. The scroll-type compressor according to claim 23, further comprising a valve disposed within said housing, said valve controlling fluid flow through said fluid passage.

25. The scroll-type compressor according to claim 24, wherein said valve is controlled by a pressurized fluid from outside said shell.

* * * * *